US007004269B2

(12) United States Patent
Song et al.

(10) Patent No.: US 7,004,269 B2
(45) Date of Patent: Feb. 28, 2006

(54) DRIVING APPARATUS FOR A ROBOT CLEANER

(75) Inventors: Jeong-Gon Song, Gwangju (KR); Ju-Sang Lee, Gwangju (KR); Jang-Youn Ko, Gwangju (KR); Kyong-Hui Jeon, Chungcheongnam-do (KR); Ki-Man Kim, Gwangju (KR)

(73) Assignee: Samsung Gwangju Electronics Co. Ltd., Gwangju (KR)

( * ) Notice: Subject to any disclaimer, the term of this patent is extended or adjusted under 35 U.S.C. 154(b) by 125 days.

(21) Appl. No.: 10/457,173

(22) Filed: Jun. 9, 2003

(65) Prior Publication Data

US 2004/0195012 A1 Oct. 7, 2004

(30) Foreign Application Priority Data

Apr. 4, 2003 (KR) ................................ 10-2003-0021455

(51) Int. Cl.
*B62D 11/02* (2006.01)

(52) U.S. Cl. ........................................................ 180/6.5

(58) Field of Classification Search .................. 180/8.1, 180/6.5, 6.48, 65.1–65.5, 167–169
See application file for complete search history.

(56) References Cited

U.S. PATENT DOCUMENTS

| | | | | |
|---|---|---|---|---|
| 4,306,329 A | * 12/1981 | Yokoi | ......................... | 15/319 |
| 4,515,235 A | * 5/1985 | Yamamoto et al. | ......... | 180/168 |
| 4,951,768 A | * 8/1990 | Littmann et al. | .......... | 180/14.1 |
| 5,036,941 A | * 8/1991 | Denzin et al. | .............. | 180/252 |
| 5,432,416 A | * 7/1995 | Tae-Sig | ................. | 318/568.12 |
| 5,454,129 A | * 10/1995 | Kell | ............................ | 15/1.7 |
| 5,497,529 A | * 3/1996 | Boesi | ......................... | 15/319 |
| 5,535,843 A | * 7/1996 | Takeda et al. | .............. | 180/200 |
| 5,554,914 A | * 9/1996 | Miyazawa | ............. | 318/568.11 |
| 5,720,077 A | 2/1998 | Nakamura et al. | ......... | 15/340.1 |
| 5,988,306 A | * 11/1999 | Ooishi | ........................ | 180/168 |
| 6,106,362 A | * 8/2000 | Keller et al. | ................ | 446/456 |
| 6,481,515 B1 | 11/2002 | Kirkpatrick et al. | ....... | 180/65.1 |

FOREIGN PATENT DOCUMENTS

| | | |
|---|---|---|
| DE | 100 55 751 | 5/2002 |
| EP | 0 214 877 | 3/1987 |
| JP | 03-121930 | 5/1991 |
| WO | WO 01/091623 A2 | 12/2001 |
| WO | WO 02/067744 A1 | 9/2002 |
| WO | WO 02/067744 | 9/2002 |

OTHER PUBLICATIONS

Russian Office Action dated Nov. 4, 2004.

* cited by examiner

*Primary Examiner*—Lesley D. Morris
*Assistant Examiner*—Paul Royal, Jr.
(74) *Attorney, Agent, or Firm*—Ohlandt, Greeley, Ruggiero & Perle L.L.P.

(57) ABSTRACT

Disclosed is a driving apparatus for a robot cleaner enabling drive wheels to be in contact with a floor all the time. The driving apparatus for a robot cleaner includes a robot cleaner main body, driving motors mounted in the robot cleaner main body, and for transferring power to drive wheels, driving motor housings hinged with the robot cleaner main body, and for accommodating the driving motors therein, and pressure members disposed between the robot cleaner main body and the driving motor housings, and for pressing the driving motor housings. Accordingly, the driving motor housings are mounted to rotate about the center of the rotation hinges so that the drive wheels come in contact with the floor all the time, preventing the drive wheels from being lifted over the floor and making lost rotations due to curved portions of the floor or obstacles.

8 Claims, 4 Drawing Sheets

DRIVING APPARATUS FOR A ROBOT CLEANER

BACKGROUND OF THE INVENTION

1. Field of the Invention

The present invention relates to a robot cleaner, and more particularly to a driving apparatus for a robot cleaner having a driving unit capable of dealing with thresholds or obstacles.

2. Description of the Prior Art

In general, a robot cleaner performs cleaning jobs alone without users' commands. Such a robot cleaner is mainly used indoor, so it has lot of occasions coming across obstacles such as thresholds, carpet, or the like. For these occasions, a damping unit is provided to have drive wheels in contact with floor all the time and to reduce shock transferring to the main body of the robot cleaner.

FIG. 1 to FIG. 3 are views for showing a driving apparatus for a robot cleaner, disclosed in PCT WO 02/067744, in which a damping unit is provided.

As shown in FIG. 1 to FIG. 3, a robot cleaner is sealed in a circular housing 10. A filter container (not shown) is mounted inside the housing 10 to accommodate collected dirt such as dust and the like therein. Further, two drive wheels 12 are installed diametrically opposite to each other inside the robot cleaner. Each drive wheel 12 is rotatably mounted on a drive wheel shaft 13, and in front and rear of which two supporting parts, that is, rear rollers 14 and front rollers 15 are mounted. The rear rollers 14 are in contact with floor, help the robot cleaner to operate, and are installed at each side of a central axis directed in the movement direction of the robot cleaner. Further, the front rollers 15 are mounted in front of the drive wheel shaft 13. The supporting parts provided with the front and rear rollers 14 and 15 create a gap between the floor and the bottom surface of the robot cleaner, so the bottom surface of the robot cleaner is prevented from being a direct contact with the floor.

The two drive wheels 12 are formed of materials having a high friction coefficient, and, as shown in FIG. 2 and FIG. 3, mounted to a drive wheel support 16. The drive wheel support 16 is connected to an electric motor 17 and a transmission 18.

The drive wheel support 16 reduces vertical movements of the housing 10, in which an upwardly directed part 20 is engaged with a slide bearing 21 by screws for supporting the wheels 12 in the vertical direction, and the sliding bearing 21 can reciprocate in upward and downward directions by the slide rail 22.

The slide bearing 21 and the slide rail 22 are disposed between upper and lower wall parts 23 and 24, and a dowel 25 restrains the slide bearing 21 and the slide rail 22, the upper end of the dowel 28 connected to the spring coil 26 and a collar 27 rests in a seat 29 provided in the upper wall part 23, so that the dowel 28 can play a damping role.

In the meantime, the transmission 18 is provided with an extension arm 34, and slidably coupled with a bracket 36 on which two micro switches 35 connected to a lower wall part 24 are installed. The micro switches 35 are activated when the wheels 12 become spaced from the floor due to a shape of the floor or obstacles, notifying a certain control unit of whether the wheels 12 are in contact with the floor.

However, as shown in FIG. 1 to FIG. 3, the drive wheel support 16 provided to the drive wheels 12 provides only a small range of ascending and descending motion as the robot cleaner comes across obstacles or thresholds. Accordingly, as one drive wheel 12 rolls over a hole on the floor or a slanted place, the other drive wheel 12 is lifted over the floor rather than being in contact with the floor. Therefore, as one drive wheel is lifted to roll in air, the robot cleaner cannot return to its normal state alone without users' help.

Further, the conventional robot cleaner has a problem that, since the power of the electric motor 17 is transferred through a gear train, that is, the transmission 18, noise due to gears and power loss can be produced, and a structure becomes complicated with possibly poor assemble, increasing the manufacturing cost, since wall members supporting the transmission 18 are additionally required.

SUMMARY OF THE INVENTION

The present invention has been devised to solve the problem, so it is one aspect of the present invention to provide a driving apparatus for a robot cleaner having an improved structure that enables drive wheels to come in contact with floor all the time.

It is another aspect of the present invention to provide a driving apparatus for a robot cleaner having a simplified power transmission unit for a drive motor and drive wheels with assemble improved and the manufacturing cost reduced.

In order to achieve the above aspects and/or features of the present invention, a driving apparatus for a robot cleaner includes a robot cleaner main body; driving motors mounted in the robot cleaner main body, and for transferring power to drive wheels; driving motor housings hinged with the robot cleaner main body, and for accommodating the driving motors therein; and pressure members inserted between the robot cleaner main body and the driving motor housings, and for pressing the driving motor housings.

According to a preferred embodiment of the present invention, the robot cleaner main body includes a lower frame forming a bottom part of the robot cleaner; and support brackets coupled with the lower frame, and for rotatably supporting the driving motor housings.

At this time, preferably, the support brackets comprises hinge support members which are formed at position corresponding to hinge members of driving motor housings, for supporting the hinge members toward the bottom part.

Further, the driving motors may be connected to the drive wheels moving the robot cleaner main body, and, at this time, the driving wheels may have outer circumferential faces formed in saw shapes thereon.

Further, the driving motor housings may be each formed of an upper housing and a lower housing, and, preferably, the upper and lower housings each have a rotation hinge protruded in a vertical direction with respect to the drive wheels and parallel with the bottom part.

Further, the rotation hinges may be cylindrical protrusions which are formed as semi-circular protrusions formed at upper and lower housings are engaged with each other.

Further, preferably, the pressure members may be coil springs, and, preferably, the coil springs are fixed with one ends thereof to first seat parts formed on the lower sides of the support brackets, and accommodated with the other ends thereof in second seat parts formed on the outer circumferential faces of the driving motor housings.

At this time, preferably, the first seat parts each have a guide groove formed in a cylindrical shape having space therein and for preventing the coil spring from being released; and a coupling protrusion protruded on a central portion of the guide groove and having an outer circumferential face of a size corresponding to an inner circumferential face of the coil spring.

Further, the second seat parts are each formed in a hollow cylinder shape, and have a seat groove having an inner circumferential face of a size corresponding to an outer circumferential face of the coil spring.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENT

Hereinafter, a preferred embodiment of the present invention will be described with reference to the accompanying drawings.

Figure 1:
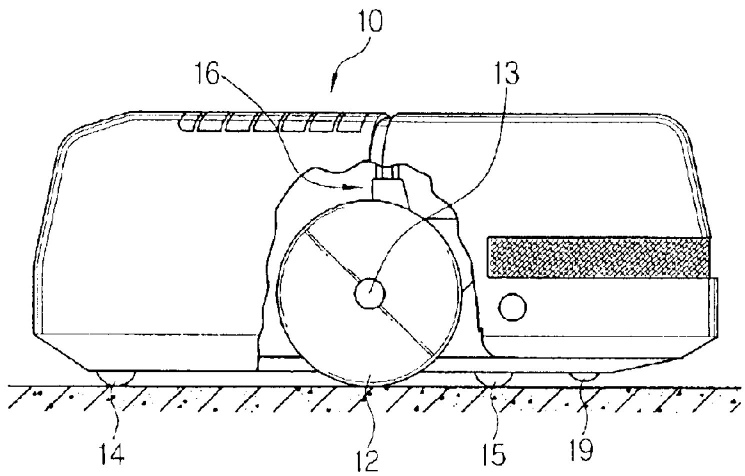
FIG. 1 is a partially cut-off view of a conventional robot cleaner.
Figure 2:
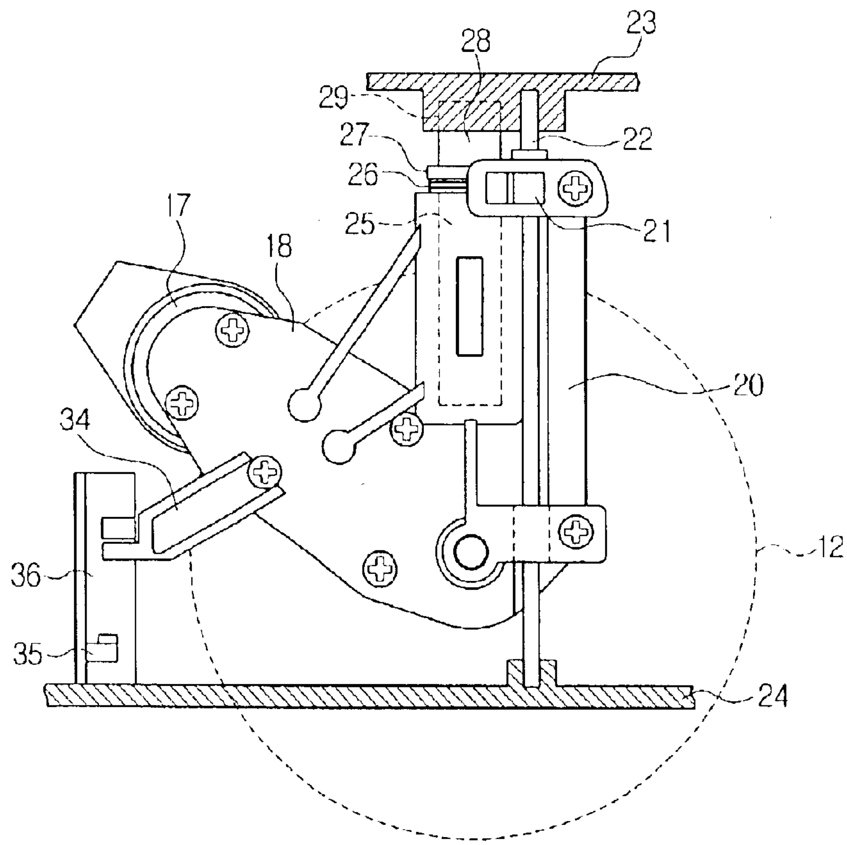
FIG. 2 is a side view of a drive wheel shaft of FIG. 1.
Figure 3:
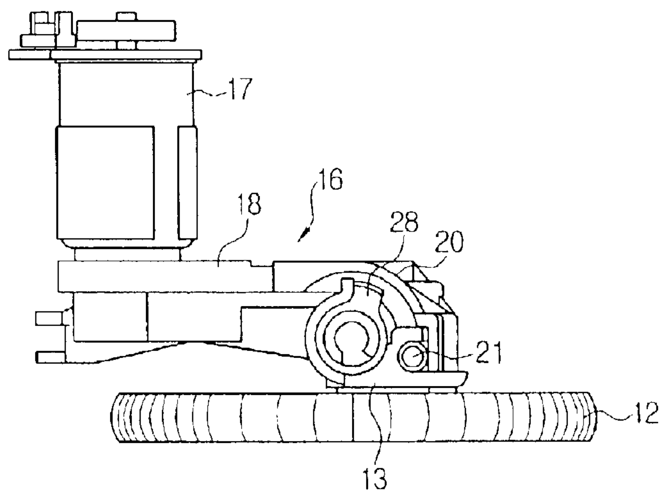
FIG. 3 is a plan view of FIG. 2.
Figure 4:
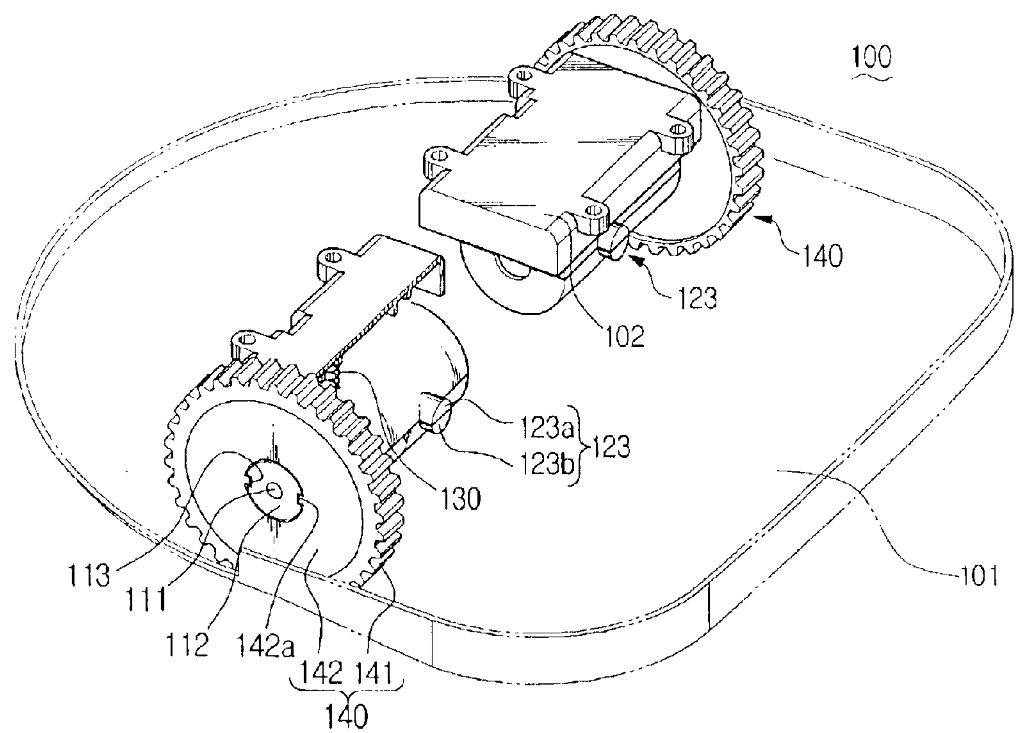
FIG. 4 is a perspective view for showing a driving apparatus for a robot cleaner according to an embodiment of the present invention.
Figure 5:
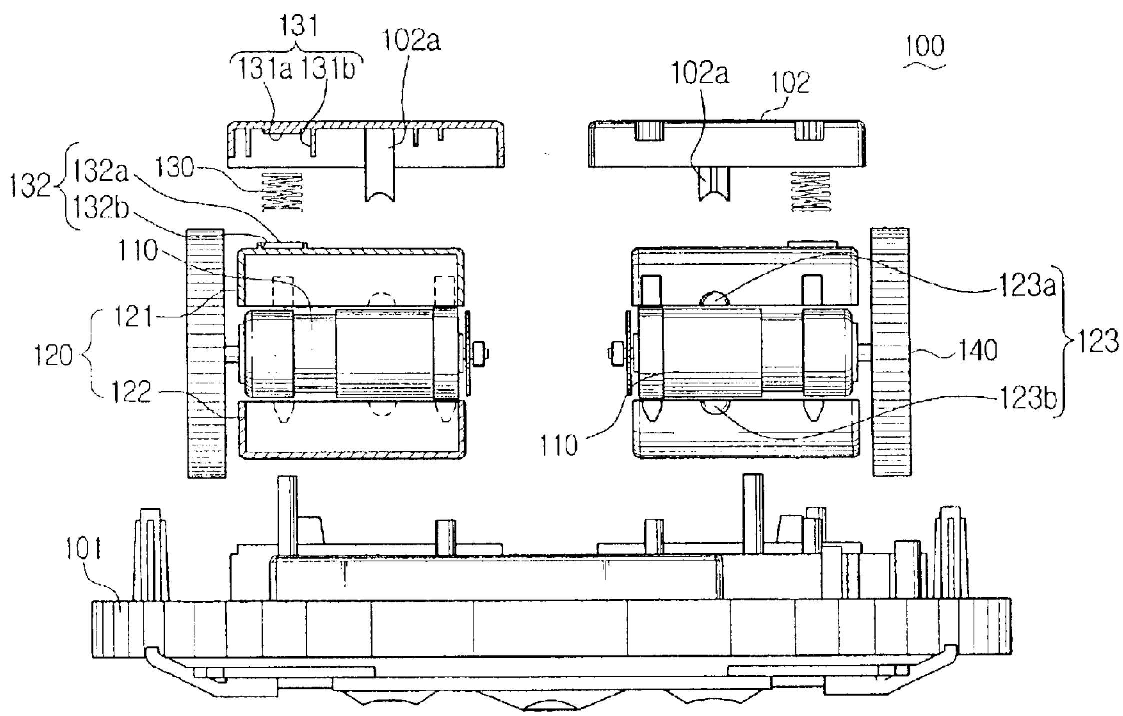
FIG. 5 is an exploded assembly front view for showing a driving apparatus for a robot cleaner according to an embodiment of the present invention.

As shown in FIG. 4 and FIG. 5, a driving apparatus for a robot cleaner according to the present invention has a robot cleaner main body 100, driving motors 110 mounted in the robot cleaner main body 100 and for driving the robot cleaner, driving motor housings 120 hinged with the robot cleaner main body 100 and for accommodating the driving motors 110 therein, pressure members 130 for pressing the upper sides of the driving motor housings 120 and supporting the hinged driving motors 110, and drive wheels 140.

The robot cleaner main body 100 has a lower frame 101 forming the bottom part of the robot cleaner, and support brackets 102 engaged with the lower frame 101 and rotatably supporting the driving motor housings 120. On the upper side of the lower frame 101 is seated the driving motor housings 120 in which the driving motors 110 are installed, and mounted a dirt-collecting unit and a control unit which are not shown.

The support brackets 102 rotatably supports the driving motor housings 120 seated on the lower frame 101. The support brackets 102 are provided with hinge support members 102*a*. The hinge support members 102*a* are formed at positions corresponding to rotation hinges 123 protruded on the driving motor housings 120, and rotatably support the rotation hinges 123. The hinge support members 102*a* will be described in detail together with the driving motor housings 120 later.

The driving motors 110 provide power necessary to move the robot cleaner. On the centers of the driving motors 110 are connected driving shafts 111 outputting power. The driving motors 110 transfer power with the driving shafts 111 directly connected to drive wheels 140, rather than using an additional power transmission unit such as a transmission. That is, since the power of the driving motors 110 is directly transferred to the drive wheels 140, a robot cleaner having less power loss and smaller in size with less driving unit volume can be provided.

In the meantime, the driving motors 110 are provided with connection members 112 for connecting the driving shafts 111 and the driving wheels 140. The driving shafts 111 are connected to the centers of the connection members 112, and formed in a cylindrical shape having a certain thickness. A pair of fixture grooves 113 is formed opposite to each other on the circumference of each of the connection members 112, and the fixture grooves 113 are engaged with fixture projections 142*a* protruded at positions corresponding to inner wheels 142, so that the driving motors 110 and the driving wheels 140 can rotate together without slippage occurring therebetween. Albeit not shown, the fixture grooves 113 may not be necessarily provided in a pair, but can be provided as a plurality of fixture grooves 113 which are opposite to each other. The driving wheels 140 are described later.

The driving motor housings 120 are each formed with an upper housing 121 and a lower housing 122. The upper and lower housings 121 and 122 each have one rotating hinge 123 protruded in the vertical direction with respect to the driving shafts 111 of the drive wheels 140 and parallel with the bottom part. The rotation hinges 123 are formed in a cylindrical protrusion for which semi-circular protrusions 123*a* and 123*b* formed at positions corresponding to the junction end parts of the upper and lower housings 121 and 122 are combined. The rotation hinges 123 formed with the cylindrical protrusions are preferably protruded one by one forward and backward of the driving motor housings 120, as shown in FIG. 4 and FIG. 5.

The upper parts of rotation hinges 123 are supported by the hinge support members 102*a*. The end portions of the hinge support members 102*a* have inner circumferential faces and are formed to correspond to the rotation hinges 123, to thereby enclose the outer circumferential faces of the rotation hinges 123. It is preferable for the hinge support members 102*a* to have semi-circular contact end portions to correspond to the outer circumferential faces of the rotation hinges 123. By the hinge support members 102*a* formed as above, the rotation hinges 123 are supported, so that driving motor housings 120 can rotate about the rotation hinges 123.

The pressure members 130 are preferably formed with coil springs inserted between the lower frame 101 and the support brackets 120. The coil springs are fixed with one ends thereof to first seat parts 131 formed on the lower sides of the support brackets 102, and accommodated with the other ends thereof into second seat parts 132 formed at positions opposite to the first seat parts 131 on the outer circumferential faces of the driving motor housings 120.

The first seat parts 131 are formed in a hollow cylinder shape, and each have a coupling protrusion 131*a* coupled on the inner circumferential face of one coil spring and a guide groove 131*b* preventing the coil spring from being released. At this time, the coupling protrusion 131*a* is protruded around the central portion of the guide groove 131.

The second seat parts 132 are formed in a cylindrical shape having a space defined therein. At this time, the bottom faces 132*a* of the second seat parts 132 are formed to correspond to the outer circumferential faces of the coil springs, and the seat grooves 132*b* of the same are formed to have walls extended at a certain height along the bottom faces 132*a*.

Accordingly, the coil springs are inserted between the first and second seat parts 131 and 132, prevented by the guide grooves 131*b* from being released, and presses the driving motor housings 120 toward the bottom faces.

The drive wheels 140 are directly connected to the driving motors 110. As mentioned above, the driving motors 110 have the driving shafts 111 directly connected to the drive wheels 140 without a transmission using an additional gear train. The driving wheels 140 each have the outer wheel 141 in direct contact with a floor and the inner wheel 142 connected to one driving motor 110. The outer wheel 141 is preferably formed of material having a high friction coefficient, and has an outer circumferential face convexo-concave in a saw shape. Due to the material and shape of such an outer wheel 141, the ground contact pressure of the drive wheels 140 in contact with a floor can be increased. Accordingly, the increase of the ground contact pressure of the drive wheels 140 prevents the drive wheels 140 from lost rotations or slippage.

In the meantime, the inner and outer wheels 141 and 142 may be formed in one body, or provided in separate members to combine the outer wheel 141 on the outer circumferential face of the inner wheel 141.

For example, the outer drive wheel 141 of rubber or resin material having a high friction coefficient can be fit on the outer circumferential face of the circular inner wheel 142.

Hereinafter, operations of the driving apparatus for a robot cleaner according to the present invention will be described with reference to the accompanying drawings.

Figure 6:
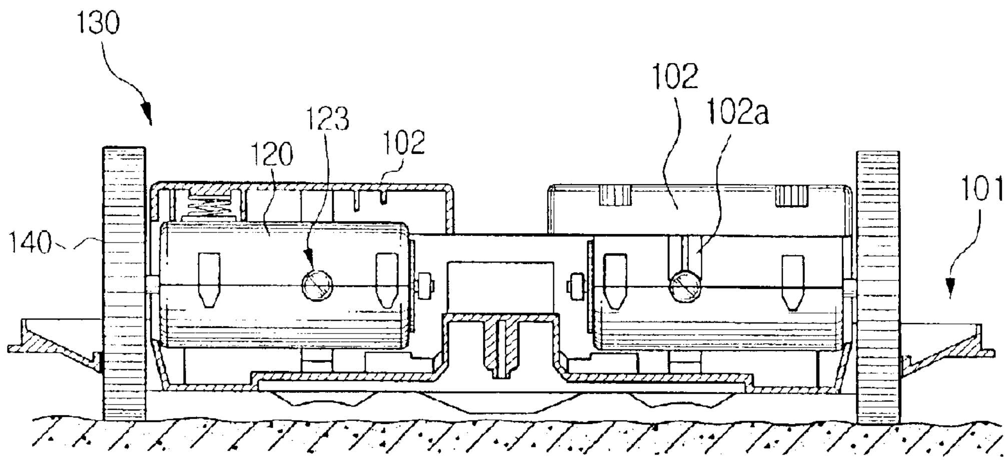
FIG. 6 is a front view for showing a driving apparatus of a robot cleaner operating on a even floor according to an embodiment of the present invention.
Figure 7:
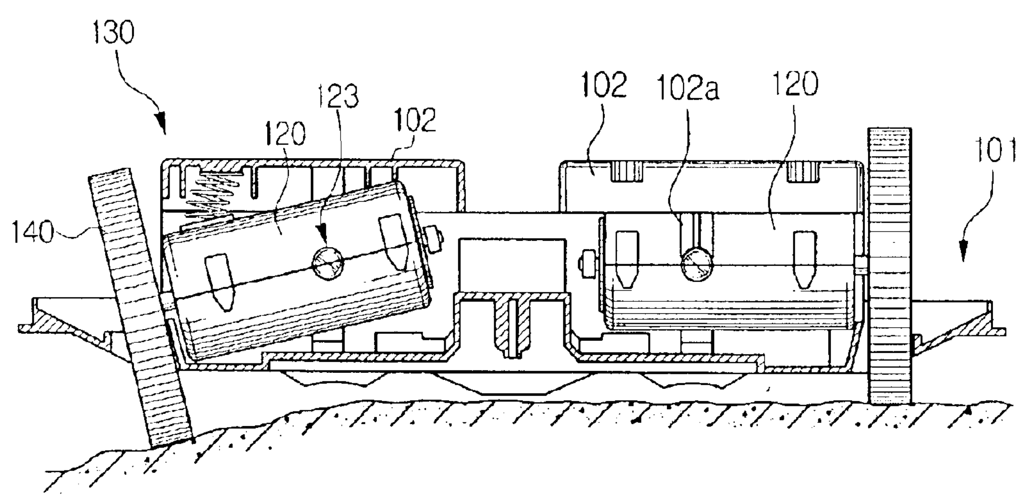
FIG. 7 is a front view for showing a driving apparatus of a robot cleaner operating on an uneven floor according to an embodiment of the present invention.

FIG. 6 and FIG. 7 are views for showing operations of the driving apparatus for a robot cleaner according to an embodiment of the present invention.

FIG. 6 is a plan view for showing a partly cut-off robot cleaner having a driving apparatus operating on a flat floor according to an embodiment of the present invention.

As shown in FIG. 6 and FIG. 7, in case of a flat floor, the robot cleaner main body 100 comes in contact with the floor with all the drive wheels 140 mounted on both sides thereof. That is, the pressure members 130 apply moment of force to rotate the driving motor housings 120 about the rotation hinges 123. However, the force moment has a value smaller than a vertical drag force of gravity applied to the drive wheels 140, that is, force applied by the self-weight of the robot cleaner, so that the driving motor housings 120 do not rotate, but are placed parallel with the floor.

However, as shown in FIG. 7, as the drive wheels at one side are lifted over the floor due to curved portions of the floor or obstacles, the lifted drive wheels 140 have only the moment force applied by the pressure members 130. Accordingly, the driving motor housings 120 accommodating the driving motors 110 rotate about the rotation hinges 123 till the drive wheels 140 come in contact with the floor.

Accordingly, even though the robot cleaner main body is lifted over the floor due to curved portions of the floor or obstacles, the drive wheels 140 come in contact with the floor all the time, and are prevented from lost rolling (or rotations), to thereby enable the robot cleaner to stably operate.

As mentioned above, in the driving apparatus for a robot cleaner according to the present invention, the driving motor housings are mounted to rotate about the center of the rotation hinges so that the drive wheels come in contact with the floor all the time, preventing the drive wheels from being lifted over the floor and making lost rotations due to curved portions of the floor or obstacles.

Further, in the driving apparatus for a robot cleaner according to the present invention, since the driving motors and the drive wheels are directly connected, any power transmission unit is not additionally required, which brings out the reduced number of parts, enhanced assembleability, and reduced manufacturing cost, to thereby strengthen the competitive force of products.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A driving apparatus for a robot cleaner, comprising:

a robot cleaner main body comprising a lower frame and support brackets, the lower frame forming a bottom part of the robot cleaner and the support brackets being connected with the lower frame;

driving motors mounted in the robot cleaner main body, and for transferring power to drive wheels;

driving motor housings hinged with the robot cleaner main body, and for accommodating the driving motors therein, the support brackets rotatably supporting the driving motor housings; and pressure members disposed between the robot cleaner main body and the driving motor housings, and for pressing the driving motor housings.

2. The driving apparatus for a robot cleaner as claimed in claim 1, wherein the support brackets comprises hinge support members which are formed at position corresponding to hinge members of the driving motor housings, for supporting the hinge members toward the bottom part.

3. The driving apparatus for a robot cleaner as claimed in claim 1, wherein the driving motor housings each comprise an upper housing and a lower housing and wherein there is provided a rotation hinge protruded from the upper and lower housings respectively in a vertical direction with respect to the drive wheels and parallel with the bottom part.

4. The driving apparatus for a robot cleaner as claimed in claim 3, wherein the rotation hinges are cylindrical protrusions which are formed as semi-circular protrusions formed at upper and lower housings are engaged with each other.

5. The driving apparatus for a robot cleaner as claimed in claim 1, wherein the pressure members are coil springs.

6. The driving apparatus for a robot cleaner as claimed in claim 5, wherein the coil springs are fixed with one ends thereof to first seat parts formed on the lower sides of the support brackets, and accommodated with the other ends thereof in second seat parts formed on the outer circumferential faces of the driving motor housings.

7. The driving apparatus for a robot cleaner as claimed in claim 6, wherein the first seat parts each have:

a guide groove formed in a cylindrical shape having a space defined therein and for preventing the coil spring from being released; and a coupling protrusion protruded on a central portion of the guide groove and having an outer circumferential face of a size corresponding to an inner circumferential face of the coil spring.

8. The driving apparatus for a robot cleaner as claimed in claim 6, wherein the second seat parts are each formed in a hollow cylinder shape, and have a seat groove having an inner circumferential face of a size corresponding to an outer circumferential face of the coil spring.

* * * * *